Oct. 7, 1941.  H. B. MORRIS ET AL  2,258,025
MOLDING APPARATUS
Filed May 19, 1938  2 Sheets-Sheet 1

INVENTORS
HAROLD B. MORRIS
JOHN N. STREET
BY
ATTORNEYS

Oct. 7, 1941.  H. B. MORRIS ET AL  2,258,025
MOLDING APPARATUS
Filed May 19, 1938  2 Sheets-Sheet 2
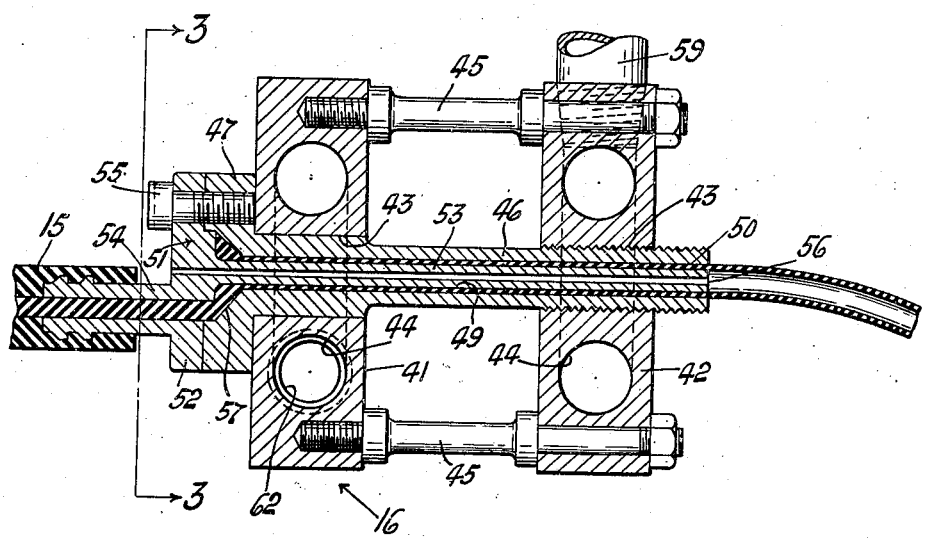
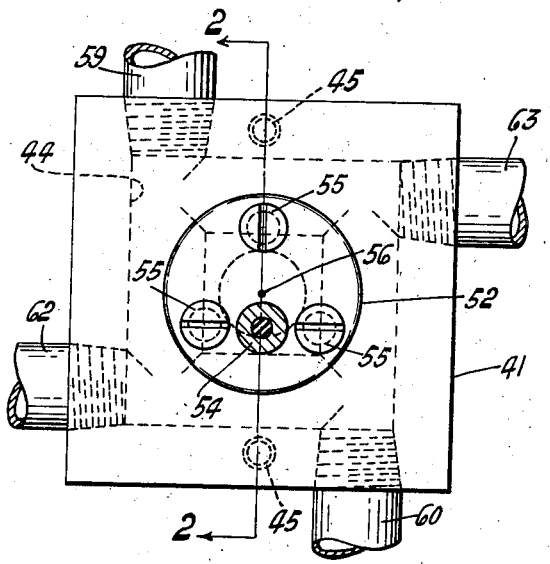
INVENTORS
HAROLD B. MORRIS
JOHN N. STREET
ATTORNEYS Patented Oct. 7, 1941

2,258,025

UNITED STATES PATENT OFFICE 2,258,025

MOLDING APPARATUS

Harold B. Morris, Cuyahoga Falls, and John N. Street, Akron, Ohio, assignors to The Firestone Tire & Rubber Company, Akron, Ohio, a corporation of Ohio Application May 19, 1938, Serial No. 208,846

3 Claims. (Cl. 18—14)

This invention relates to molding apparatus and particularly to apparatus for continuously coagulating latex while it passes through a forming mold. One general object of the invention is to provide apparatus for continuously producing tubed latex which is of desired cross-section and which retains its given shape.

Another object of the invention is to tube latex rapidly and still produce a flawless product.

These and other objects will appear from the following description.

The instant invention mainly comprises the provision of a forming mold that includes a fixed housing having a core, or mandrel, therein that is smaller than and concentric with the bore of the housing. The housing has means associated with it for heating the terminal portion thereof to coagulate any latex therein. Since the mandrel leaves a tubular opening extending through the housing, liquid latex can be forced into such opening and be coagulated as it passes through the housing. This coagulated and tubular latex rubber, is then forced from the housing by a slight pressure exerted upon the latex at the entrance end thereof so that a continuous strip of tubed latex rubber is forced from the mold. Any suitable means may be used to cure and dry the tubed latex.

The present invention is to be practiced with heat-sensitized latex, such as is disclosed in the Pestalozza Reissue Patent No. 18,437.

In the accompanying drawings:

Figure 2 is a central vertical section taken on line 2—2 of Figure 3 through the forming mold of the apparatus;

Figure 3 is a section on line 3—3 of Figure 2.

Figure 1:
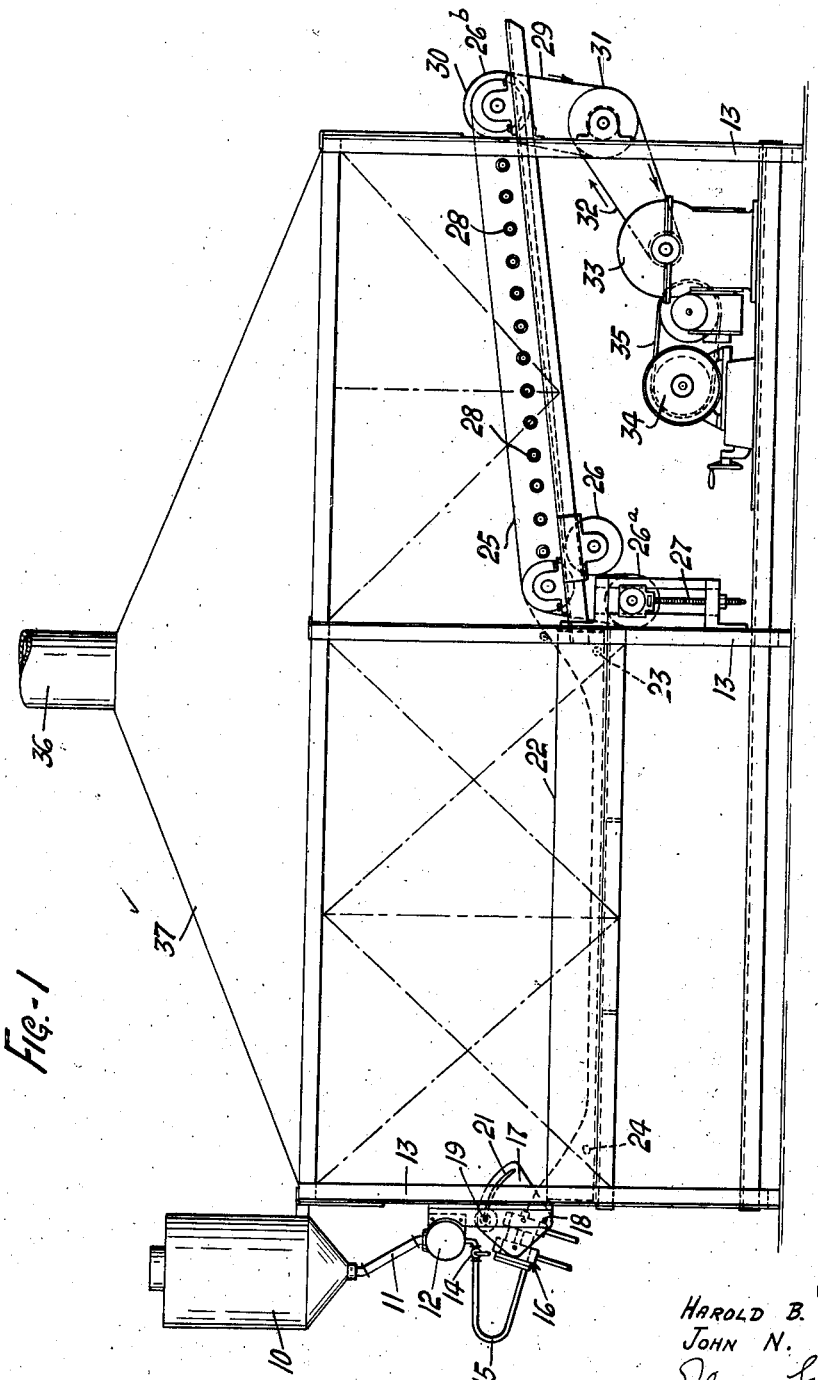
Figure 1 is side elevation of apparatus embodying the invention.

More specifically, Figure 1 of the drawings illustrates a storage container 10 in which the latex to be tubed is placed and from which it flows by gravity through pipe 11 to the distributing tank 12 that is secured upon a frame 13. Flow of latex from the tank 12 is controlled by a valve 14 which connects to a flexible conduit 15 that leads to a relatively long forming mold 16 that is adapted to coagulate latex continuously in tubular form. The mold will be specifically described hereinafter.

In order to mount the hold 16 so its angle with the horizontal is variable, it is secured to a plate 17 that is pivotally carried by a pin 18 on the frame 13. A second pin 19 on the frame engages with an arcuate slot 21 in plate 17 to limit the plate's movement. Thus in starting the flow of latex, the position of the mold can be varied for it usually is desirable to tilt the mold upwardly in initially filling it with latex. Necessarily the latex initially in the mold is coagulated prior to starting the continuous production of tubing to set-up the required resistance to flow through the mold. Ordinarily the pressure head provided by the latex in the container 10 is sufficient to force the latex through the mold 16 but external pressure means for forcing latex through the nozzle obviously may be used. Normally a pressure of one to ten pounds suffices.

It will be appreciated that as many forming molds as desired may be connected to the distributing tank 12, although only one such mold is shown.

A vat, or tank 22 is carried by the frame 13 and is positioned to receive the tubed latex from mold 16. Pipes 23 and 24 connect to the tank 22 for circulating steam through water normally held in the tank to cure the latex tube therein. A conveyor 25 is associated with the frame 13 at one end of the tank 22 to pull the tubed strip from the tank. The conveyor 25 includes an endless belt which is carried by pulleys 26 that are journalled on frame 13; pulley 26a being adjustably supported by screw 27 for take-up purposes. Steam pipes 28 are associated with the conveyor 25 to dry any material thereon and connect to a source of steam (not shown). This heating action in some cases acts to complete the cure of the tubed latex, which may be collected from the conveyor in any suitable manner.

The conveyor 25 is driven by a belt 29 which connects to a pulley 30 on the shaft of the pulley 26b. The belt 29 extends to a drum 31 which is journalled on the frame 13 and which is driven by a belt 32 that connects to the slow speed side of a speed reducer 33. A motor 34 drives the speed reducer by a belt 35. The conveyor 25 is adapted to be driven at the speed at which the rubber is extruded. Necessarily the tank 22 and conveyor 25 are made of such length in relation to the movement of the strip of rubber that it is processed in the desired manner. A cover 37 usually should be placed over the tank 22 and conveyor 25 to exhaust gases rising therefrom through flue 36.

Figure 2 shows the details of the forming mold 16 that includes two metallic blocks 41 and 42, each of which has a central aperture 43 and a chamber 44 formed therein. Bolts 45 secure the blocks together in spaced relation with the apertures 43 aligned. A housing 46 having a threaded end extends through the apertures 43 and engages with threads cut in the block 42 to secure it in such position and place it in heat-transfer relation with the blocks 41 and 42. The end of the housing 46 adjacent the block 41 has an enlarged cylindrical head 47 which is drawn against block 41 to fix the housing against movement. The head 47 should be reamed out adjacent the bore 49 of the housing, as shown, to aid in forming a receiving chamber for latex prior to its passage through the mold.

A core, or mandrel 51, which includes a short, relatively wide cylindrical portion 52 that has tubular arms 53 and 54 extending from opposite sides thereof, is tightly secured to the head 47 by bolts 55. The mandrel 51, having an axial bore 56 extending completely therethrough, is positioned with the tubular arm 53 in and extending the length of the bore of the housing 46, the arm being concentric with and spaced from the inner wall of the housing. Thus a tubular mold cavity 50 is formed between the arm 53 and the housing 46 and this cavity terminates and enlarges appreciably to form an annular latex-receiving, or storage chamber 57 adjacent the portion 52 of the mandrel. The arm 54 is offset from the axis of the arm 53 and projects outwardly from the mold 16. The tubular arm 54 is adapted to connect to and receive latex from the conduit 51 which is connected to the tank 12 as hereinbefore described. The inner end of the bore of the tubular arm 54 connects with the annular chamber 57 and thereby supplies it with liquid latex under pressure. The force exerted upon the latex causes it to flow into and fill the chamber 57 completely and then be forced into and through the cavity 50.

A prime feature of the invention is the continuous coagulation of the latex as it passes through the mold; heat being applied to one portion of the housing 46 for this purpose. Pipes 59 and 60, connected to the chamber 44 of the block 42, extend to a suitable source of hot fluid (not shown) to circulate the fluid through the block. Thus heat is conducted to latex in the portion of the housing adjacent the block 42 whereby that latex is coagulated in its molded tubular form and the pressure upon the latex forces the tubular rubber coagulum produced from the forming mold. Other suitable means may be used to heat the housing, if desired. It has usually been found desirable to cool the entrance portion of the housing 46 to prevent premature coagulation of the latex, so pipes 62 and 63 connect the bore 44 of block 41 to a source of cooling fluid, not shown, to circulate a cooling medium in block 41. However, in some cases it may be desirable to preheat the latex so that the block 41 may have a heating fluid supplied thereto. This block still would be at a lower temperature, usually, than the block 42.

The tubed rubber forced from the mold 16 should be prevented from collapsing and this is prevented by a bore 56 which is formed in the mandrel 51 and which provides a conduit for air flow into the bore of the tubed article. Slight pressure may be applied to force air into the tubed latex rubber to retain it in such form. In all events, the bore extending completely through the mandrel 51 functions to prevent formation of a vacuum in the tubed product.

Another feature of the invention resides in the positive coagulation action provided thereby when the latex is molded in the desired cross-sectional form.

It will be seen that the formation of weak spots in the finished tube is substantially eliminated by the invention, for air bubbles, which are the chief cause of such defects, can not get into the tubing chamber which constantly is completely filled with latex.

Any superfluous water not bodily carried in the coagulated latex will merely be forced from the housing 46 and drip therefrom.

Obviously, the mandrel may be supplied with latex from two or more arms similar to the arm 54, if desired. It also is apparent that the invention may be used to produce a solid thread, strip, or sheet of latex rubber, if desired.

In accordance with the patent statutes, we have illustrated and described the principle and mode of operation of the preferred embodiment of the invention. However, it will be understood that various modifications can be made without departing from the scope of the invention as described in the appended claims.

We claim:

1. A forming mold comprising two metallic blocks having central apertures and chambers formed therein, means securing said blocks together in spaced relation with their central apertures in alignment and forming a unit therewith, means associated with one of said blocks for circulating a cooling fluid through the chamber therein, means associated with the other of said blocks for circulating a heating fluid through the chamber therein, a housing extending through the central apertures of said blocks secured to at least one of said blocks, said housing being provided with an end head which is adjacent the block having cooling fluid circulating therethrough, said end head being recessed adjacent the bore of said housing to flare it outwardly, and a mandrel provided with tubular arms protruding from opposite sides thereof secured to the end head of said housing, one of said tubular arms extending into the bore of said housing and being concentric with and spaced from the inside wall of said housing to leave a tubular cavity in the bore of said housing, said mandrel and said end head forming an annular chamber in which one end of the tubular cavity through said housing terminates, the remaining tubular arm of said mandrel connecting to said annular chamber and being adapted to connect to a source of latex whereby latex can be forced into said annular chamber and then through the tubular cavity between said housing and said mandrel where it is formed into a tubular strip of rubber.

2. A forming mold comprising two metallic blocks having central apertures and chambers formed therein, means securing said blocks together, means associated with said blocks for circulating fluids of controlled temperatures therethrough, a housing extending through the central apertures of said blocks, and a mandrel provided with tubular arms protruding from opposite sides thereof secured in said housing, said mandrel having a bore extending longitudinally therethrough, one of said tubular arms extending into the bore of said housing and being concentric with and spaced from the inside wall of said housing to provide a tubular cavity extending through said housing, the remaining tubular arm of said mandrel communicating with said tubular cavity and being adapted to connect to a source of latex whereby latex can be forced through the tubular cavity in said housing and be formed into a tubular rubber coagulum.

3. In latex molding apparatus, a housing having a head formed thereon at one end thereof, said head being recessed adjacent the bore of said housing to flare it outwardly, and a mandrel positioned in the bore of said housing and spaced from said housing to form a tubular cavity therein, said mandrel being provided with a head portion associated with the head of said housing and forming an annular cavity therebetween which is connected to said tubular cavity, a tubular arm being formed integral with said mandrel head and being offset relative to said mandrel, said tubular arm connecting to said annular cavity whereby latex can readily be forced into said tubular cavity.

HAROLD B. MORRIS.
JOHN N. STREET.